United States Patent
Lee et al.

(10) Patent No.: US 9,653,741 B2
(45) Date of Patent: May 16, 2017

(54) FUEL CELL STACK

(75) Inventors: Jin-Hwa Lee, Yongin-si (KR); Hee-Tak Kim, Yongin-si (KR); Tae-Yoon Kim, Yongin-si (KR); Geun-Seok Chai, Yongin-si (KR); Sung-Yong Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1165 days.

(21) Appl. No.: 13/237,816

(22) Filed: Sep. 20, 2011

(65) Prior Publication Data

US 2012/0270133 A1 Oct. 25, 2012

(30) Foreign Application Priority Data

Apr. 25, 2011 (KR) ........................ 10-2011-0038512

(51) Int. Cl.
- *H01M 8/04* (2016.01)
- *H01M 8/04186* (2016.01)
- *H01M 8/086* (2016.01)
- *H01M 8/2455* (2016.01)

(52) U.S. Cl.
CPC ....... *H01M 8/04186* (2013.01); *H01M 8/086* (2013.01); *H01M 8/2455* (2013.01)

(58) Field of Classification Search
CPC . H01M 8/04186; H01M 8/086; H01M 8/2455
See application file for complete search history.

(56) References Cited

U.S. PATENT DOCUMENTS

2007/0020502 A1 1/2007 Cho et al.
2009/0081503 A1* 3/2009 Ju et al. .......................... 429/22

FOREIGN PATENT DOCUMENTS

| JP | 07-82867 | 9/1995 |
|---|---|---|
| JP | 08-008109 B2 | 1/1996 |
| JP | 09-35727 | 2/1997 |
| JP | 2001-035511 A | 2/2001 |
| JP | 2005-251492 A | 9/2005 |
| KR | 10-2006-0034939 A | 4/2006 |
| KR | 10-2007-0012128 A | 1/2007 |

OTHER PUBLICATIONS

Japan Patent Abstract No. 62-222570, published Sep. 30, 1987, for JP 07-82867 listed above, 1 page.
Full English Machine Translation of JP 09-035727, 9 pages.
Korean Office action No. 10-2011-0038512, dated Sep. 28, 2012, 4 pages.
Patent Abstracts of Japan Publication No. 02-144856, dated Jun. 4, 1990 for JP 08-008109 B2, 1 page.
Machine English Translation for JP 2005-251492 A, Patent Abstracts of Japan, 13 pages.
Notice of Allowance dated Mar. 27, 2013, issued in Korean Patent Application No. 10-2011-0038512, 5 pages.
Machine translation for JP-2001-035511, Feb. 9, 2011, 5 pages.

* cited by examiner

*Primary Examiner* — Ula C Ruddock
*Assistant Examiner* — Frank Chernow
(74) *Attorney, Agent, or Firm* — Lewis Roca Rothgerber Christie LLP

(57) ABSTRACT

A fuel cell stack includes at least one membrane electrolyte assembly having an electrolyte membrane, an anode on a first surface of the electrolyte membrane, and a cathode on a second surface opposite to the first surface of the electrolyte membrane; and at least one supply member coupled to the electrolyte membrane and configured to supply a conductive material to the electrolyte membrane.

10 Claims, 12 Drawing Sheets

FUEL CELL STACK

CROSS-REFERENCE TO RELATED APPLICATION

This application claims priority to and the benefit of Korean Patent Application No. 10-2011-0038512 filed in the Korean Intellectual Property Office on Apr. 25, 2011, the entire content of which is incorporated herein by reference.

BACKGROUND

1. Field

The described technology relates generally to a fuel cell stack.

2. Description of the Related Art

A fuel cell stack includes a plurality of membrane electrode assemblies (MEAs) and a separator (referred to as 'bipolar plate') that is positioned between the MEAs.

Here, each MEA includes an electrolyte membrane, an anode that is positioned at one side of the electrolyte membrane, and a cathode that is positioned at the other side of the electrolyte membrane. The separator forms a fuel channel at one surface toward the anode to supply fuel to the anode and forms an oxidizing agent channel at one surface toward the cathode to supply an oxidizing agent to the cathode. Accordingly, electrical energy is generated by a hydrogen oxidation reaction of the anode and an oxygen reduction reaction of the cathode, and a heat and water are additionally generated.

Here, the electrolyte membrane has an ion exchange function of moving protons that are generated in the anode to the cathode. Phosphoric acid ($H_3PO_4$) is used as a conductive material for exchanging ions in an electrolyte membrane that is used for an MEA for a high temperature. The MEA for a high temperature is generally manufactured by impregnating a polybenzimidazole (PBI) membrane with phosphoric acid ($H_3PO_4$). In this case, in order to embody optimum performance of the MEA for a high temperature, it is known that an impregnation ratio of phosphoric acid is about 300% (a weight ratio of an electrolyte membrane and phosphoric acid). Therefore, when phosphoric acid ($H_3PO_4$) having a weight of about three times or more than the electrolyte membrane is impregnated, mechanical strength of the electrolyte membrane is lowered, and thus when the MEA is manufactured, the electrolyte membrane may be damaged.

Further, when a fuel cell is operated for a long time, phosphoric acid of the electrolyte membrane can leak to the outside by water that is generated in the cathode and thus performance of the fuel cell can be deteriorated.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a fuel cell stack having advantages of preventing deterioration of mechanical strength of an electrolyte membrane that may occur when the electrolyte membrane is impregnated with excessive phosphoric acid by supplying conductive material to an MEA while operating a fuel cell.

The described technology has been made in an effort to further provide a fuel cell stack having increased operation efficiency by supplying conductive material to an MEA while operating a fuel cell.

An exemplary embodiment provides a fuel cell stack including: at least one membrane-electrolyte assembly (MEA) including an electrolyte membrane, an anode that is positioned on a first surface of the electrolyte membrane, and a cathode that is positioned at a second surface opposite to the first surface of the electrolyte membrane; and at least one supply member that is coupled to the electrolyte membrane to supply a conductive material.

The supply member may include a first supply member that contacts the first surface of the electrolyte membrane; and a second supply member that contacts the second surface of the electrolyte membrane.

Penetration openings may be formed in each of the first supply member and the second supply member, and the penetration openings of the first supply member and the second supply member may be connected to each other.

The supply members having the penetration opening may be installed to be connected to each other to form a connection passage within the fuel cell stack.

A conductive material may be supplied to the connection passage, and the conductive material may be phosphoric acid ($H_3PO_4$).

The supply member may include a penetration opening and include at least one sealing member that is installed at a periphery of the penetration opening.

The fuel cell stack may further include a rotation body that penetrates the supply members.

The rotation body may have a protruding portion that receives torque at one side thereof and have a protrusion of a protruded spiral shape at an external circumferential surface.

The rotation body may have a protruding portion that receives torque at one side thereof and include at least one protrusion that is disposed at one side opposite to the protruding portion.

The supply member may be coupled to an outer circumferential surface of the MEA.

The supply member may have at least one coupling groove that include a hollow portion and that is coupled to the electrolyte membrane of the MEA.

A conductive material may be supplied to the MEA, and the conductive material may be phosphoric acid ($H_3PO_4$).

According to an aspect of the present invention, deterioration of mechanical strength of an electrolyte membrane that may occur when the electrolyte membrane is impregnated with excessive phosphoric acid can be prevented.

According to another aspect of the present invention, by supplying a predetermined amount of conductive material to an electrolyte membrane of an MEA while operating a fuel cell, operation efficiency of the fuel cell can be increased.

DETAILED DESCRIPTION

Figure 1:
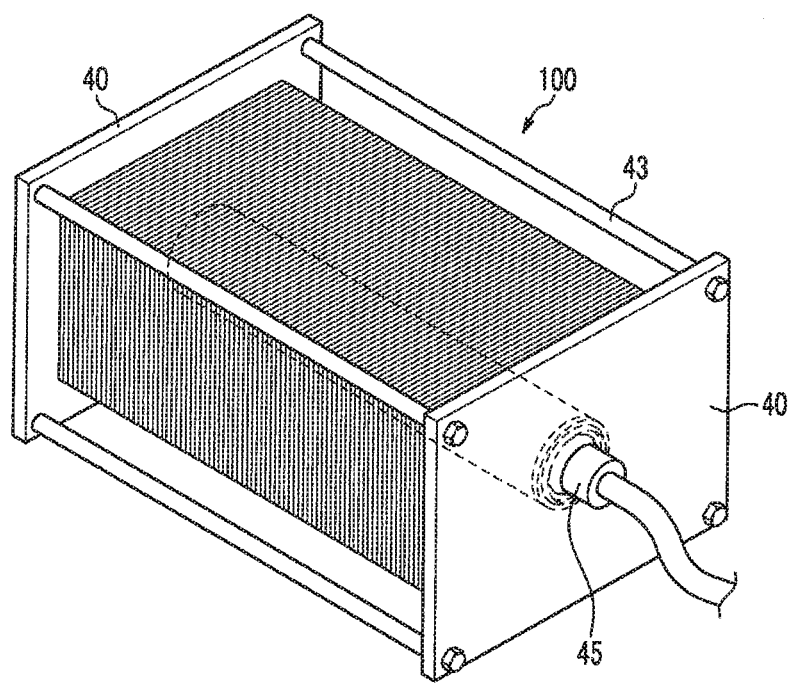
FIG. 1 is a perspective view illustrating a fuel cell stack according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
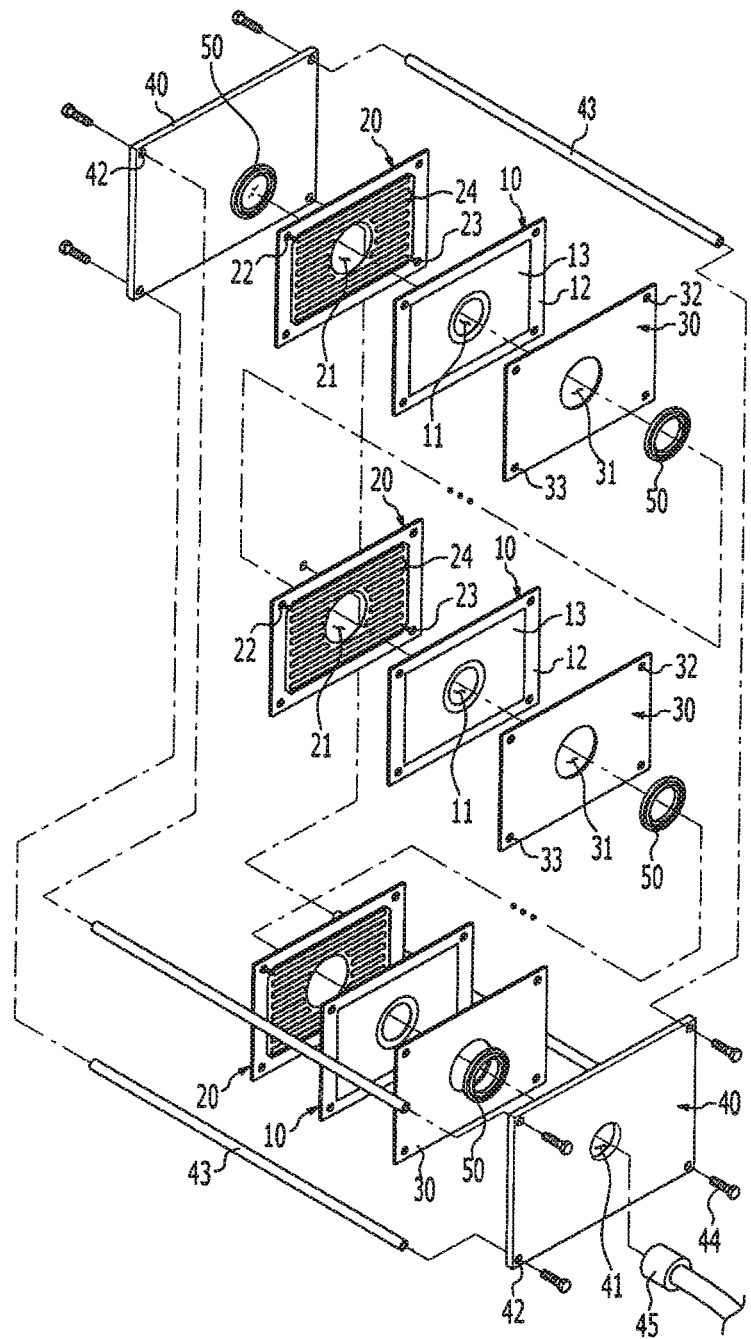
FIG. 2 is an exploded perspective view illustrating the fuel cell stack of FIG. 1.

FIG. 1 is a perspective view illustrating a fuel cell stack according to a first exemplary embodiment of the present invention, and FIG. 2 is an exploded perspective view illustrating the fuel cell stack of FIG. 1.

Referring to FIGS. 1 and 2, a fuel cell stack 100 according to a first exemplary embodiment of the present invention includes at least one MEA 10, a plurality of cathode side separators 20 and anode side separators 30 that are located between the MEAs 10 to contact with the MEA 10 and that separate a plurality of MEAs 10, and a plurality of supply members 50.

Here, an MEA 10 and separators 20 and 30 that contact the MEA 10 form an electric generation unit (hereinafter, referred to as a 'unit cell') for generating electricity in the fuel cell stack 100.

Further, in the fuel cell stack 100, a pair of end plates 40 are oriented to contact the outermost unit cells, and the fuel cell stack 100 is securely assembled by a plurality of supports 43 and a fastening means such as a bolt 44 that penetrates the end plate 40.

The MEA 10 includes an electrolyte membrane 12, a cathode contacting one surface of the electrolyte membrane 12, and an anode 14 contacting the other surface of the electrolyte membrane 12. Further, a through-hole 11 is formed in the MEA 10.

An oxidizing agent inlet manifold 22 and an oxidizing agent outlet manifold 23 are formed at the edge of the cathode side separator 20. Further, an oxidizing agent channel 24 having concave grooves that are connected to the oxidizing agent inlet manifold 22 and the oxidizing agent outlet manifold 23 is formed in the separator 20. Therefore, an oxidizing agent that is injected to the oxidizing agent inlet manifold 22 is discharged to the oxidizing agent outlet manifold 23 by passing through the oxidizing agent channel 24. Further, a through-hole 21 that is opposite to the through-hole 11 of the MEA 10 is formed in the cathode side separator 20.

A fuel inlet manifold 32 and a fuel outlet manifold 33 are formed at the edge of the anode side separator 30. In one embodiment, the fuel inlet manifold 32 and the fuel outlet manifold 33 are connected to a fuel channel that are formed with concave grooves, and an oxidizing agent that is injected to the fuel inlet manifold 32 is discharged to the fuel outlet manifold 33 by passing through the fuel channel. Further, a through-hole 31 is formed in the anode side separator 30.

The supply member 50 is inserted into the through-hole 21 that is formed in the cathode side separator 20 and the through-hole 31 that is formed in the anode side separator 30 and is installed opposite to the through-hole 11 that is formed in the MEA 10. Therefore, the supply member 50 contacts a portion of the electrolyte membrane 12 that protrudes to a periphery of the through-hole 11 that is formed in the MEA 10. In one embodiment, a penetration opening is formed in the supply member 50, and as shown in FIG. 2, a unit cell includes a pair of supply members 50 that are opposite installed.

Further, referring to a portion that is indicated by a dotted line of FIG. 1, when a plurality of unit cells in which a pair of supply members 50 having a penetration opening are installed are oriented to contact each other, the penetration openings of the supply members 50 are connected to form a connection passage that penetrates the inside of the fuel cell stack 100.

In the end plate 40 that contacts the outermost anode side separator 30 of the fuel cell stack 100, an injection hole 41 is formed opposite to the through-hole 31 that is formed in the separator 30. A conductive material can be supplied to a connection passage that is formed in the inside of the fuel cell stack 100 through the injection hole 41.

Therefore, a conductive material that is supplied to the injection hole 41 that is formed in the end plate 40 travels through the connection passage of the fuel cell stack 100. Here, an injection hole stopper 45 is inserted into the injection hole 41 to prevent a material that is filled in the connection passage from being leaked to the outside.

Further, as the conductive material is lost while operating the fuel cell stack 100, in order to prevent performance of the fuel cell stack 100 from being deteriorated, conductive material may be supplied from the outside through the injection hole 41.

When a fuel cell is operated, a conductive material of the electrolyte membrane 12 is consumed and thus a concentration of the conductive material of the electrolyte membrane 12 is reduced. Therefore, a conductive material that is filled in a connection passage of the fuel cell stack 100 is absorbed to a portion of the electrolyte membrane 12 having a reduced concentration.

Figure 3:
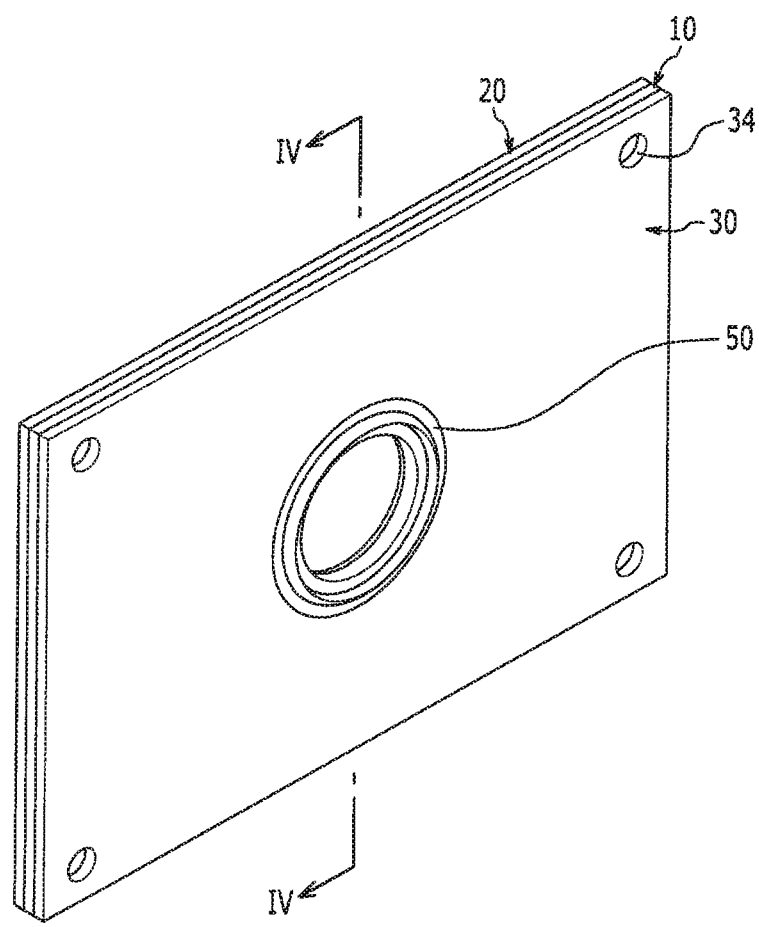
FIG. 3 is a perspective view illustrating coupling of an MEA and a separator in the fuel cell stack that is shown in FIG. 2.
Figure 4:
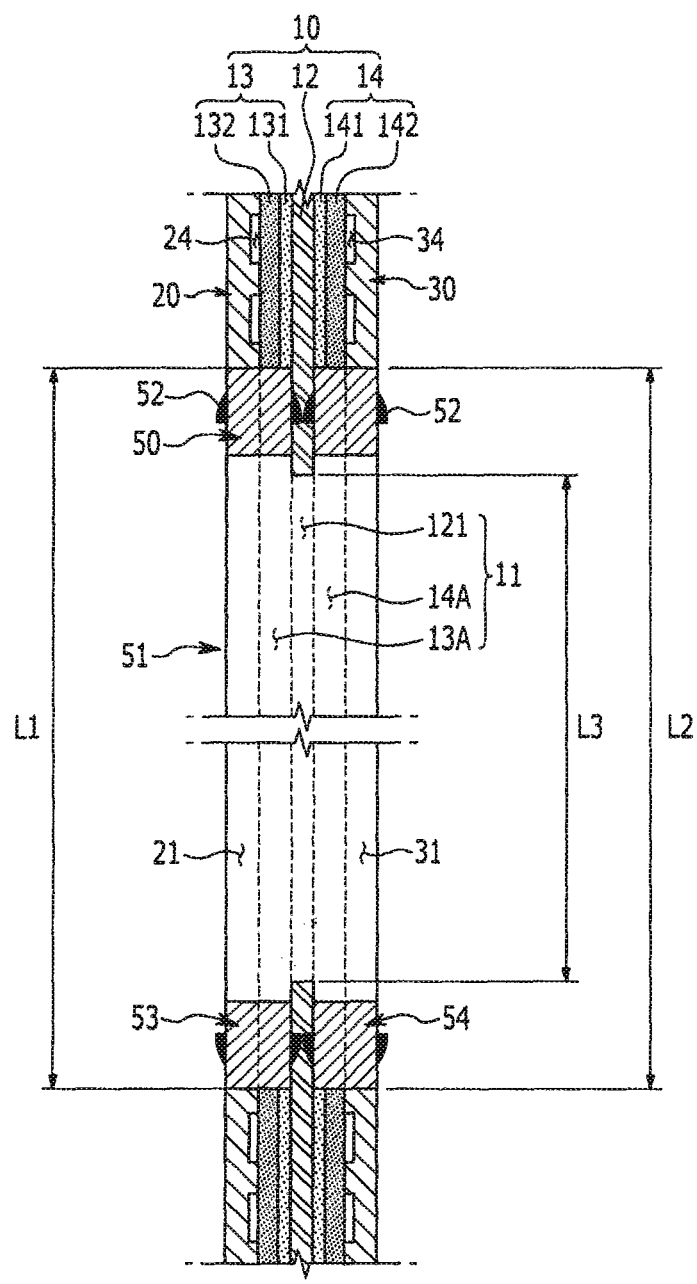
FIG. 4 is a partial cross-sectional view taken along line IV-IV of FIG. 3.

FIG. 3 is a perspective view illustrating coupling of an MEA and a separator in the fuel cell stack that is shown in FIG. 2, and FIG. 4 is a partial cross-sectional view taken along line IV-IV of FIG. 3.

Referring to FIGS. 3 and 4, the MEA 10 includes an electrolyte membrane 12, a cathode 13 that contacts one surface of the electrolyte membrane 12, and an anode 14 that contacts the other surface of the electrolyte membrane 12.

The cathode side and anode side separators 20 and 30 act as a conductor that couples in series the cathode 13 of the MEA 10 that is positioned at one side and the anode 14 of the MEA 10 that is positioned at the other side. Further, in the cathode side and anode side separators 20 and 30, the oxidizing agent channel 24 and a fuel channel 34 are formed in one surface toward the cathode 13 and the anode 14, respectively, to supply an oxidizing agent and fuel.

Further, in the cathode side and anode side separators 20 and 30, the through-holes 21 and 31 are formed in a surface opposite to the through-hole 11 of the MEA 10.

In more detail, the cathode 13 is a portion that receives oxidizing agent and includes a catalyst layer 131 that converts oxygen to electrons and oxygen ions by a reduction reaction and a gas diffusion layer 132 that contacts an outer surface of the catalyst layer 131 and that enables smooth movement of electrons and oxygen ions. Further, the anode 14 is a portion that receives fuel and includes a catalyst layer 141 that converts hydrogen of fuel to electrons and protons by an oxidation reaction and a gas diffusion layer 142 that contacts an outer surface of the catalyst layer 141 and that enables smooth movement of electrons and oxygen ions. Further, the electrolyte membrane 12 may be a solid polymer electrolyte having a thickness of between about 50 μm to 200 μm and has an ion exchange function that moves protons that are generated in the catalyst layer 141 of the anode 14 to the catalyst layer 131 of the cathode 13.

Further, the through-hole 11 that is formed in the MEA 10 includes a through-hole 121 that is formed in the electrolyte membrane 12, a through-hole 13A that is formed in the cathode 13, and a through-hole 14A that is formed in the anode 14. Here, a diameter L1 of the through-hole 14A that is formed in the anode 14 and the through-hole 13A that is formed in the cathode 13 may be the same as a diameter L2 of a penetrating opening 51 of the supply member 50, and a diameter L3 of the through-hole 121 that is formed in the electrolyte membrane 12 may be smaller than the diameter L2 of the penetrating opening 51 of the supply member 50.

Therefore, the supply member 50 contacts a portion that protrudes from a periphery of the through-hole 121 of the electrolyte membrane 12.

The supply member 50 includes a first supply member 53 and a second supply member 54 each having a penetrating opening 51. As shown in FIG. 4, the first and second supply members 53 and 54 are inserted into the through-holes 21 and 31 of the cathode side separator 20 and the anode side separator 30, respectively, to be oriented opposite to each other, and thus the penetrating openings 51 that are formed in the first and second supply members 53 and 54 are connected. As such, a single penetrating opening 51 that penetrates the supply member 50 can be formed.

When a conductive material is filled in the connection passage that is shown in FIG. 1, a conductive material can be supplied to the electrolyte membrane 12 opposite to each penetrating opening 51 that is formed in the supply members 50.

Here, the conductive material may be one of phosphoric acid ($H_2PO_4$), water ($H_2O$), and KOH according to a type of a fuel cell in which the electrolyte membrane 12 is used.

When the fuel cell stack 100 is operated, a conductive material is used and thus a concentration of the conductive material is reduced. However, a conductive material can be supplied from the connection passage to the electrolyte membrane 12 based on a concentration difference between conductive materials of the connection passage and the electrolyte membrane 12. Therefore, a concentration of a conductive material of the electrolyte membrane 12 of the MEA 10 can be uniformly sustained.

Figure 5:
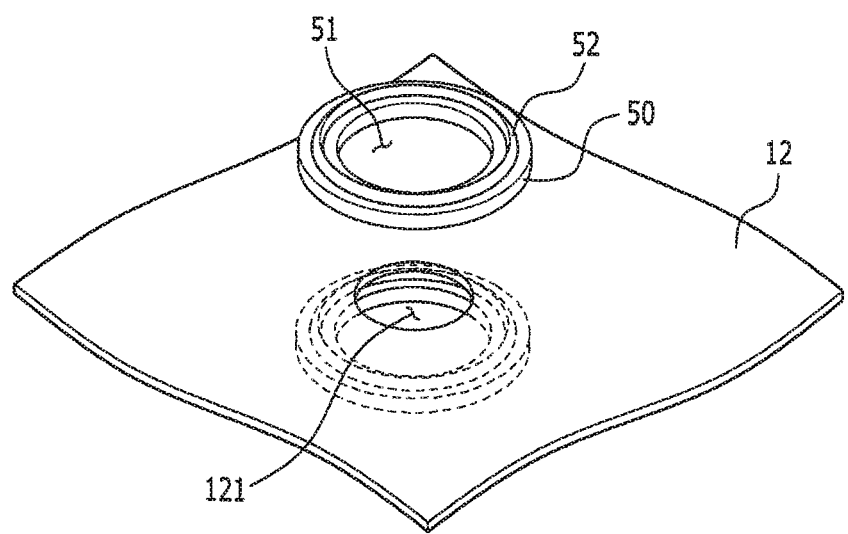
FIG. 5 is a schematic diagram illustrating a coupling state of a supply member and an electrolyte membrane that are shown in FIG. 4.
Figure 6:
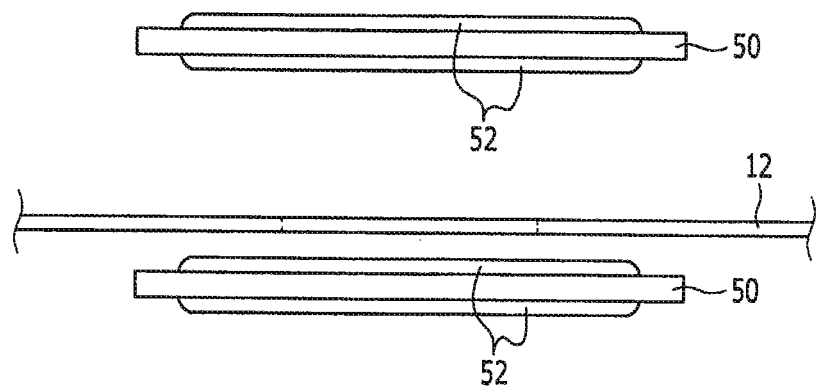
FIG. 6 is a front view of FIG. 5.

FIG. 5 is a schematic diagram illustrating a coupling state of a supply member and an electrolyte membrane that are shown in FIG. 4, and FIG. 6 is a front view of FIG. 5.

Referring to FIGS. 5 and 6, when specifically describing a coupling state of the supply member 50 and the electrolyte membrane 12, a sealing member 52 is installed in an opposite surface of the supply member 50 opposite to the electrolyte membrane 12.

Therefore, the sealing member 52 of a pair of supply members 50 contacts the electrolyte membrane 12 and thus a conductive material that is supplied to the supply member 50 is significantly prevented from being leaked between the supply member 50 and the electrolyte membrane 12. Further, the sealing member 52 may be installed at the side opposite to an opposite surface of the supply member 50 opposite to the electrolyte membrane 12.

Therefore, when unit cells are contacts, a conductive material that is supplied to the supply member 50 between the unit cells can be prevented from being leaked from the supply member 50.

However, the sealing member 52 may be omitted from an opposite surface of the supply member 50 opposite to the end plates 30 of the fuel cell stack 100. That is, referring again to FIG. 2, because the penetrating opening 51 may be omitted from an opposite surface of the supply member 50 opposite to the end plate 40, the sealing member 52 for preventing a conductive material from being leaked is also omitted. Further, as a conductive material injection hole 41 is formed in one of the end plates 40, the supply member 50 can be installed and thus the sealing member 52 for preventing a conductive material from being leaked may be omitted.

According to the present exemplary embodiment, because a conductive material that is filled in a connection passage can be directly supplied to the electrolyte membrane 12, some of the conductive material can be supplied to the electrolyte membrane 12. In one embodiment, phosphoric acid ($H_3PO_4$) can be used as a conductive material of the MEA 10.

In one embodiment, phosphoric acid ($H_3PO_4$) can be used as a proton conductor. In order to include phosphoric acid ($H_3PO_4$) in the electrolyte membrane of the MEA 10 for a high temperature, a method of impregnating the electrolyte membrane 12 with phosphoric acid ($H_3PO_4$) can be used. As an amount of phosphoric acid ($H_3PO_4$) that impregnates the electrolyte membrane 12 increases, proton conduction can be effectively performed through the electrolyte membrane 12. (e.g., when a weight ratio of an electrolyte membrane and phosphoric acid ($H_3PO_4$) is about 1:3)

However, when phosphoric acid ($H_3PO_4$) of an amount larger than a weight of the electrolyte membrane 12 is impregnated, strength of the electrolyte membrane 12 is lowered and thus the electrolyte membrane 12 may be easily damaged.

Therefore, as in the present exemplary embodiment, in order to uniformly sustain an amount of phosphoric acid ($H_3PO_4$) of the electrolyte membrane 12, if phosphoric acid ($H_3PO_4$) is supplied from the supply member 50, when the electrolyte membrane 12 is manufactured, it is unnecessary to impregnate phosphoric acid to a level to lower strength of the electrolyte membrane 12. Therefore, strength of the electrolyte membrane 12 can be prevented from being lowered, and the electrolyte membrane 12 can be prevented from being easily damaged. Further, as phosphoric acid ($H_3PO_4$) is discharged together with water that is generated when operating the fuel cell stack 100, deterioration of efficiency of the electrolyte membrane 12 can be significantly reduced or prevented when uniformly supplying phosphoric acid ($H_3PO_4$), as in the present exemplary embodiment.

Figure 7A:
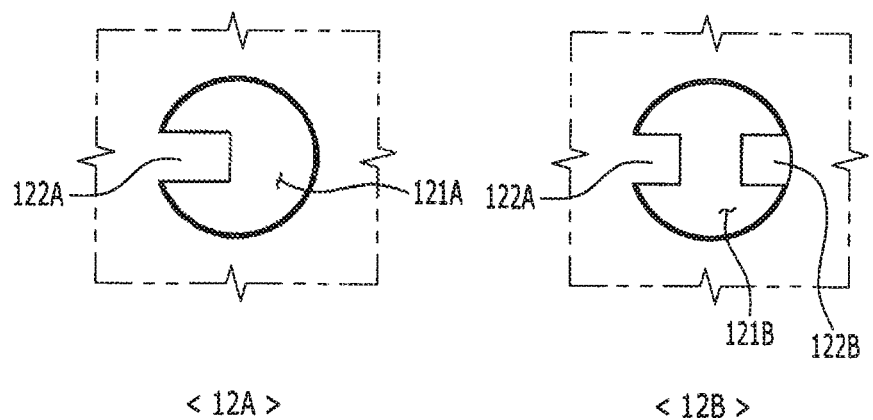
FIGS. 7A and 7B are top plan views illustrating exemplary variations of an electrolyte membrane according to a first exemplary embodiment of the present invention.
Figure 7A:
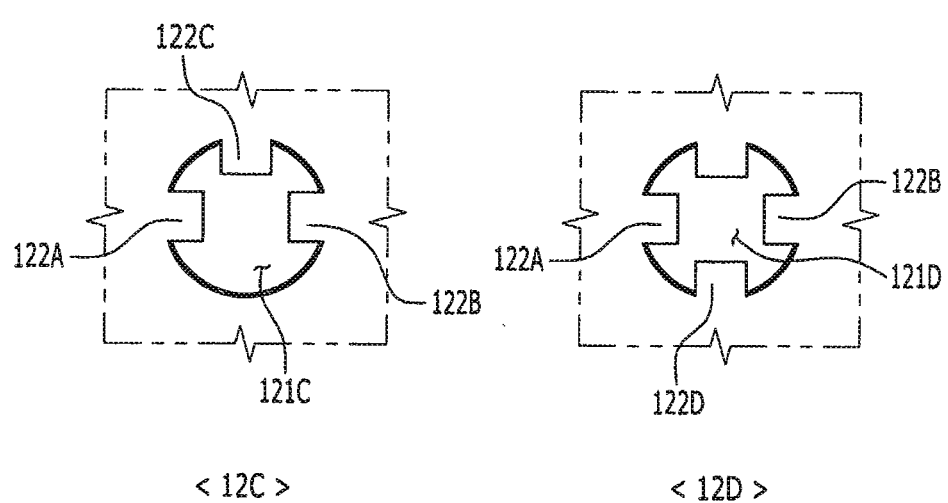
Figure 7B:
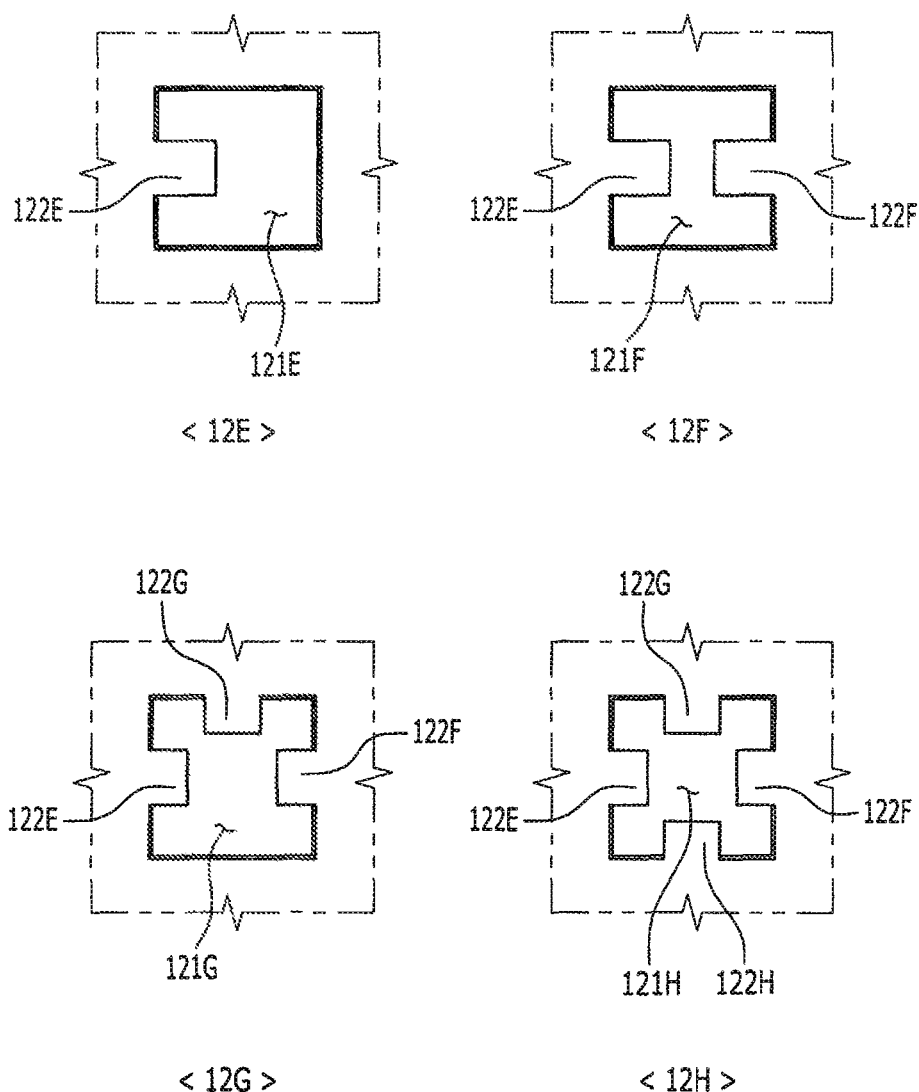
Figure 8:
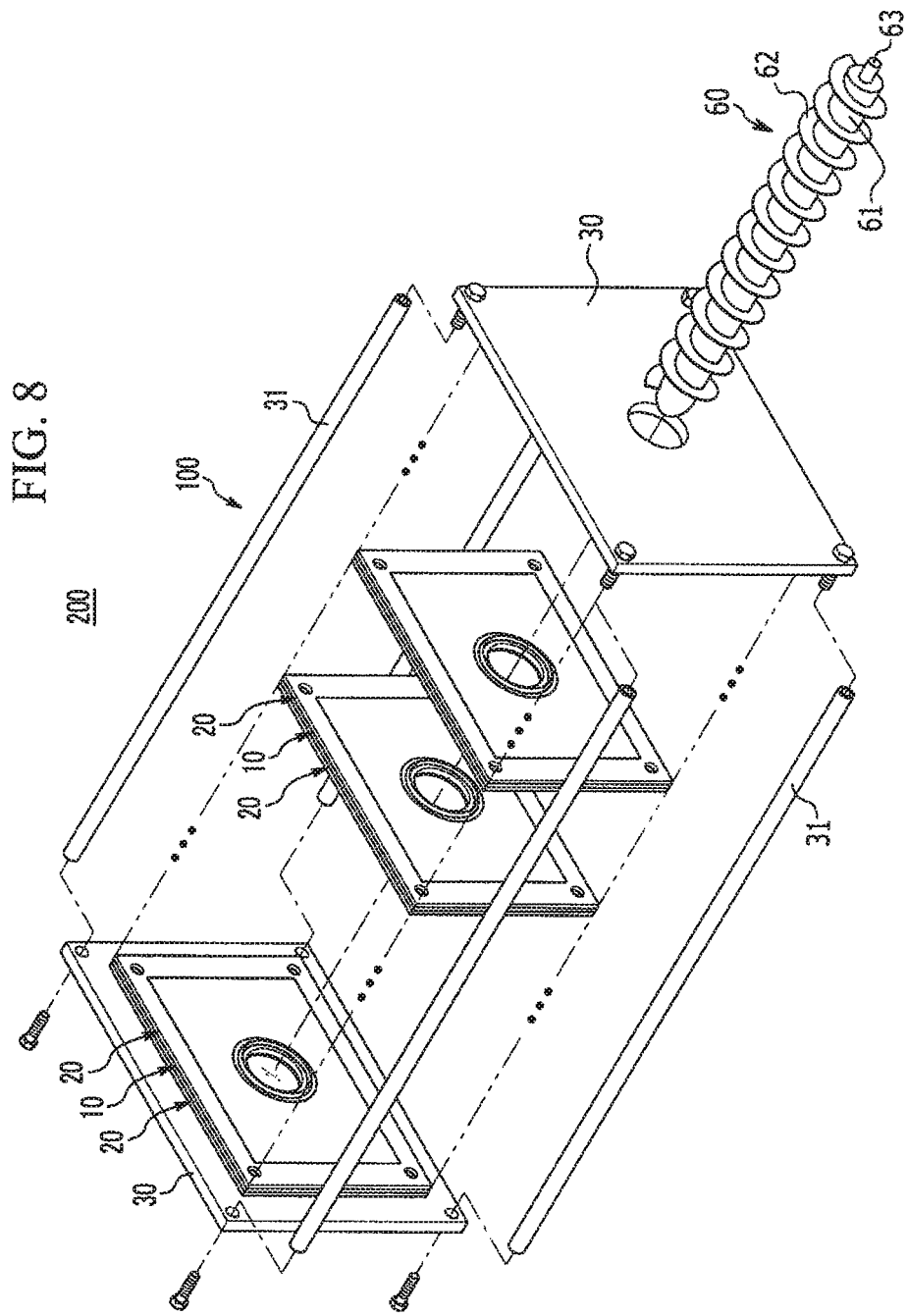
FIG. 8 is an exploded perspective view illustrating a fuel cell stack according to a second exemplary embodiment of the present invention.

FIG. 7 is a top plan view illustrating an exemplary variation of an electrolyte membrane according to a first exemplary embodiment of the present invention, and FIG. 8 is a top plan view illustrating another exemplary variation of an electrolyte membrane according to a first exemplary embodiment of the present invention.

Referring to FIGS. 7A and 7B, fuel cell stacks 101 and 102 according to the present exemplary embodiment are formed in the same structure as that of the fuel cell stack 100 according to the first exemplary embodiment, except for electrolyte membranes 12A to 12H and therefore a description of the same structure will be omitted.

The electrolyte membranes 12A to 12H according to the present exemplary embodiment include at least one protruding portion 122A to 122H that are formed in through-holes 121A to 121H of the electrolyte membranes 12A to 12H. Here, the through-holes 121A to 121H that are formed in the electrolyte membranes 12A to 12H are formed in a generally circular shape or a generally quadrangular shape.

Therefore, an area contacting the penetrating opening 51 of the supply member 50 increases by an area of the protruding portions 122A to 122H, compared with the electrolyte membrane 12 in the first exemplary embodiment and thus the electrolyte membranes 12A to 12H according to the present exemplary embodiment can supply a conductive material of an amount greater than a conductive material that is supplied to the electrolyte membrane 12 in the first exemplary embodiment.

FIG. 8 is an exploded perspective view illustrating a fuel cell stack according to a second exemplary embodiment of the present invention.

Referring to FIG. 8, a fuel cell stack 200 according to the present exemplary embodiment is formed in the same structure as that of the fuel cell stack 100 according to the first exemplary embodiment, except for a rotation body 60 and therefore a description of the same structure will be omitted.

The fuel cell stack 200 according to the present exemplary embodiment further includes a rotation body 60 that is inserted into a connection passage that is formed in the fuel cell stack 200.

As shown in FIG. 8, the fuel cell stack 200 includes an MEA 10, a plurality of unit cells including a cathode 13 and an anode 14 that are located on either side of the MEA 10 and a plurality of supply members 50 that are inserted into a supply passage that is formed in the unit cell, and end plates 40 including a support 43 and a bolt 44 that contact the outermost unit cell. Here, an injection hole 41 is formed in the end plate 40 that contacts the anode side separator 30. Further, the rotation body 60 is connected to a supply passage that is formed by a plurality of supply members 50 and is inserted into a connection passage that is formed in the fuel cell stack 200.

As shown in FIG. 8, the rotation body 60 according to the present exemplary embodiment includes a body 61, at least one protrusion 62 that is formed in the body 61, and a protruding portion 63 that is formed in one end of the body 61. In one embodiment, the body 61 is longer than the connection passage that is formed in the fuel cell stack 200.

Therefore, the rotation body 60 protrudes from the injection hole 41 in the end plate 40. Further, at least one protrusion 62 that is formed in an external circumferential surface of the body 61 is formed in a spiral shape that encloses the external circumferential surface of the body 61. However, although not shown in FIG. 8, a plurality of protrusions may be separated from each other to be formed in an external circumferential surface of the body 61. Here, a device (for example, a motor) that can supply torque can be connected to the protruding portion 63 that is formed at one end of the body 61 that is protruded to the outside of the injection hole 41 that is formed in the end plate 40.

When the rotation body 60 that is inserted into the hole that penetrates unit cells of the fuel cell stack 200 rotates by torque that is supplied to the protruding portion 63, a conductive material that is supplied to the supply member 50 rotates and thus a centrifugal force is generated. Finally, a conductive material can be supplied to the MEA 10 by a centrifugal force that is generated by the rotation body 60. Therefore, because supply of a material according to the present exemplary embodiment is performed by a centrifugal force, the material can be more effectively supplied, compared with supply by a concentration difference of the fuel cell stack 100 according to the first exemplary embodiment.

Figure 9:
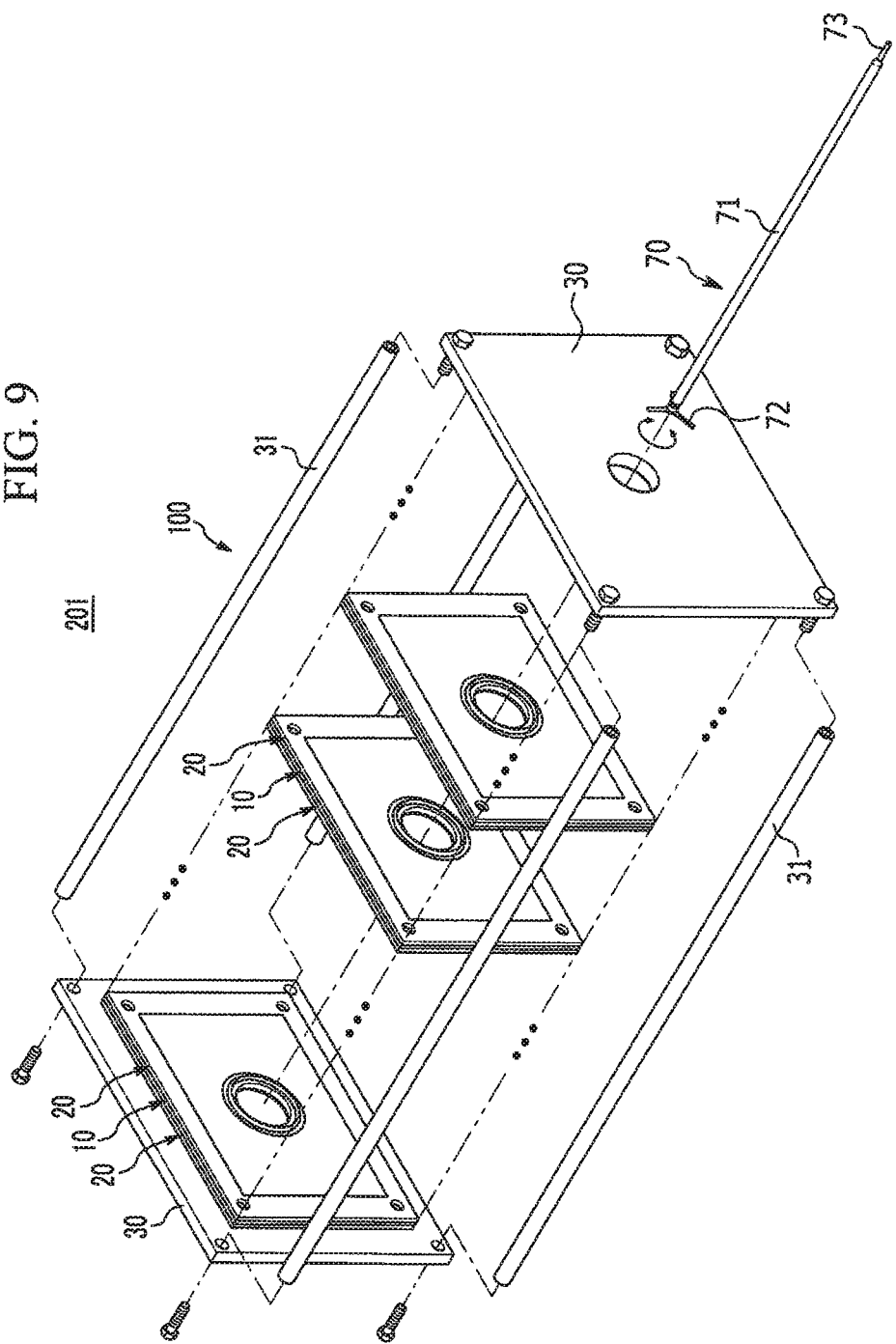
FIG. 9 is an exploded perspective view illustrating a fuel cell stack according to a third exemplary embodiment of the present invention.

FIG. 9 is an exploded perspective view illustrating a fuel cell stack according to a third exemplary embodiment of the present invention.

Referring to FIG. 9, a fuel cell stack 201 according to the present exemplary embodiment has the same structure as the fuel cell stack 200 according to the second exemplary embodiment, except for a rotation body 70 and therefore a description of the same structure will be omitted.

The rotation body 70 according to the present exemplary embodiment includes a body 71, a protrusion 72 that is formed in the body, and a protruding portion 73 that is formed at one end of the body 71.

The protrusion 72 according to the present exemplary embodiment is formed in plural on the same plane at one end of the body 71. In this case, a device (for example, a motor) that can supply torque is connected to the protruding portion 73 that is formed at one end of an opposite side of one end in which the protrusion 72 is formed.

Therefore, because the fuel cell stack 201 according to the present exemplary embodiment supplies a material to the MEA 10 by a centrifugal force that is generated by the rotation body 70, the fuel cell stack 201 can supply a material to the MEA 10 more effectively than the fuel cell stack 100 according to the first exemplary embodiment that supplies a conductive material to the MEA 10 by a concentration difference.

Figure 10:
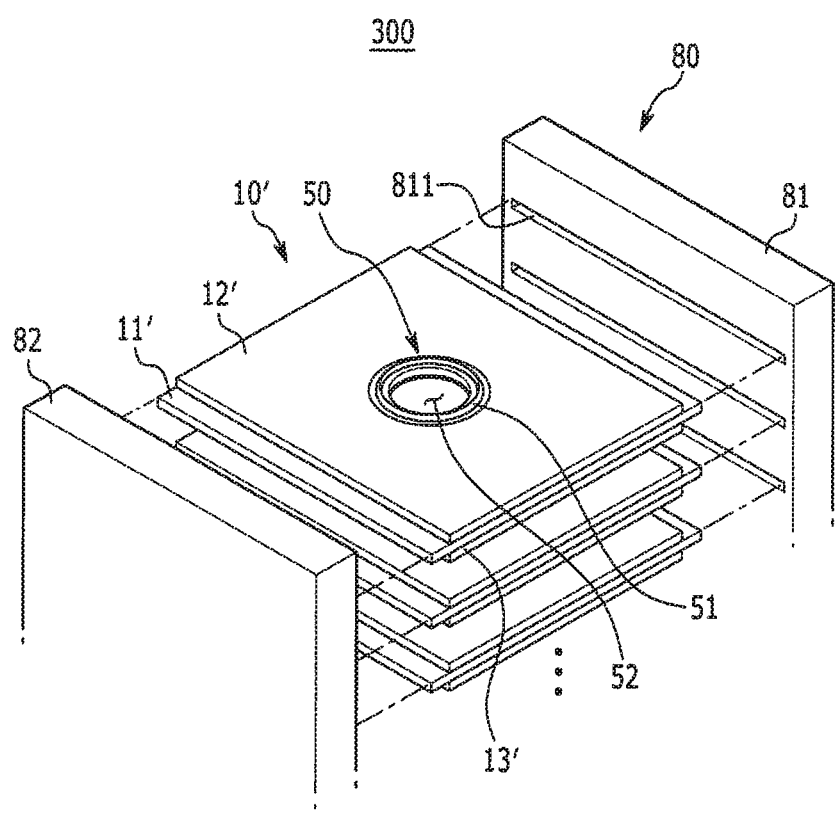
FIG. 10 is a partial exploded perspective view illustrating a coupling state of an electrolyte membrane and a supply member according to a fourth exemplary embodiment of the present invention.
Figure 11:
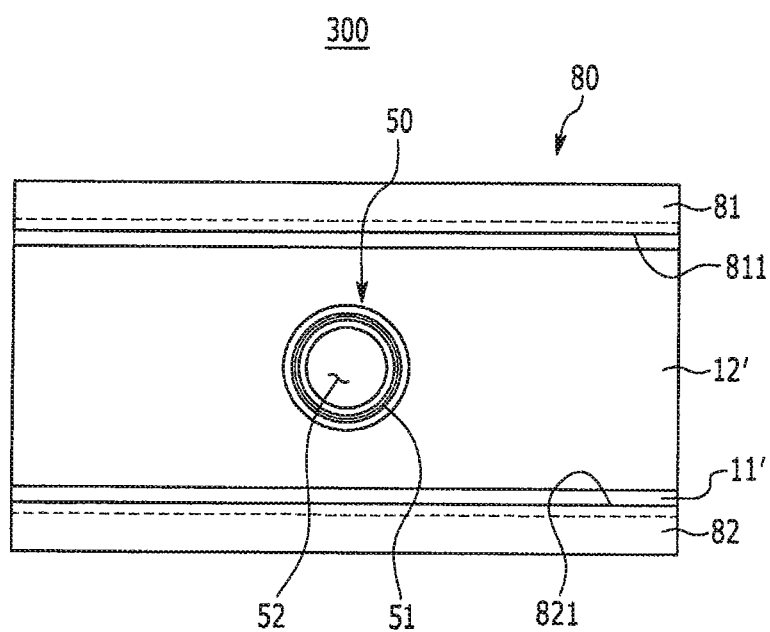
FIG. 11 is a top plan view illustrating a coupling state of a fuel cell stack of FIG. 10.

FIG. 10 is a partial exploded perspective view illustrating a coupling state of an electrolyte membrane and a supply member according to a fourth exemplary embodiment of the present invention, and FIG. 11 is a top plan view illustrating a coupling state of a fuel cell stack of FIG. 10.

Referring to FIGS. 10 and 11, a fuel cell stack 300 according to the present exemplary embodiment has the same configuration as that of the fuel cell stack 100 according to the first exemplary embodiment of the present invention, except for an MEA 10' and a side supply member 80 and therefore a description of the same configuration will be omitted.

Further, in the fuel cell stack 300 according to the present exemplary embodiment, the penetration opening 51 of the fuel cell stacks 100, 101, 200, and 201 of the first exemplary embodiment and the second exemplary embodiment is formed, and the fuel cell stack 300 includes a connection passage in which supply passages that are formed to penetrate unit cells including the sealing member 52 are connected opposite. However, in the present exemplary embodiment, a connection passage that is formed to penetrate unit cells has the same configuration as that of a connection passage according to the fuel cell stacks 100, 101, 200, and 201 in the first exemplary embodiment and the second exemplary embodiment and therefore a description thereof will be omitted.

The MEA 10' of the fuel cell stack 300 according to the present exemplary embodiment includes an electrolyte membrane 11', and a cathode 12' and an anode 13' that are located on either side of the electrolyte membrane 11'.

Here, a size of the electrolyte membrane 11' may be larger than the cathode 12' and the anode 13'. That is, as shown in FIGS. 10 and 11, in the MEA 10', a portion of the electrolyte membrane 11' is protruded. In this case, the MEA 10' according to the present exemplary embodiment may have a rectangular shape consisting of a pair of long sides and a pair of short sides, and a portion of the electrolyte membrane 11' has a protruding portion in at least one side of four sides of the MEA 10'.

However, in the present exemplary embodiment, as shown in FIGS. 10 and 11, a protruding portion of the electrolyte membrane 11' is formed in a pair of opposite long sides.

The side supply member 80 includes a first side supply member 81 and a second side supply member 82 in which a plurality of grooves 811 and 821 that can accommodate and be coupled to one of a pair of long sides are formed.

A hollow portion is formed in the inside of the first side supply member 81 and the second side supply member 82, and a conductive material (for example, phosphoric acid ($H_3PO_4$)) is supplied to the hollow portion.

Here, the conductive material can be supplied to the electrolyte membrane 11' by a concentration difference between conductive materials of the side supply members 81 and 82 and the electrolyte membrane 11', as in the fuel cell stack 100 according to the first exemplary embodiment.

However, in the fuel cell stack 100 according to the first exemplary embodiment, a conductive material is supplied to only a periphery of the center of the electrolyte membrane 11' at which the supply member 50 is positioned, but in the present exemplary embodiment, a conductive material is supplied to a side surface as well as a central portion of the electrolyte membrane 11'.

However, according to the present exemplary embodiment, the first side supply member 81 and the second side supply member 82 are coupled to the anode 13' or the cathode 12' to supply one of a hydrophilic material and a hydrophobic material. Here, one of the anode 13' and the cathode 12' may be formed larger than the electrolyte membrane 11'.

Figure 12:
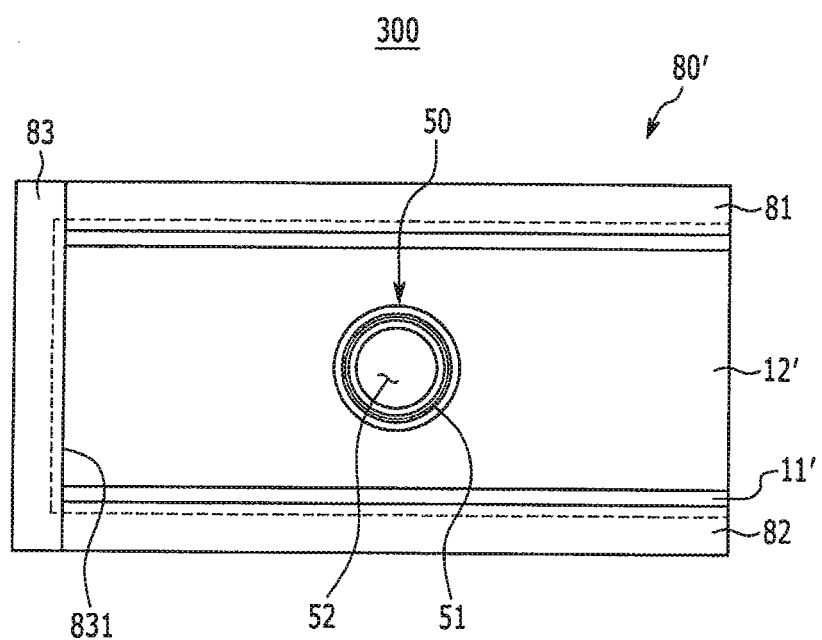
FIG. 12 is a top plan view illustrating another exemplary variation of a coupling state of an electrolyte membrane and a supply member according to a fourth exemplary embodiment of the present invention.

FIG. 12 is a top plan view illustrating another exemplary variation of a coupling state of an electrolyte membrane and a supply member according to a fourth exemplary embodiment of the present invention.

A fuel cell stack 301 according to the present exemplary embodiment has the same structure as the fuel cell stack 300 according to the fourth exemplary embodiment, except for a third side supply member 83 and therefore a description of the same structure will be omitted.

An electrolyte membrane 11" of the fuel cell stack 301 according to the present exemplary embodiment is formed larger than an anode 12". Therefore, a protruded portion of the electrolyte membrane 11" is formed in a pair of long sides and one short side.

The third side supply member 83 has a hollow portion in which a conductive material can be supplied, and in the third side supply member 83, a plurality of grooves 831 that can accommodate a protruded portion of the electrolyte membrane 11" are formed. Therefore, a protruding portion that is formed in a short side of one side of the electrolyte membrane 11" is inserted into the third side supply member 83 and thus a conductive material can be supplied to a side portion of the electrolyte membrane 11" by a concentration difference.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| membrane-electrode assembly (MEA): 10 | through-hole: 11 |
| electrolyte membrane: 12 | anode: 13 |
| cathode: 14 | cathode side separator: 20 |
| anode side separator: 30 | end plate: 40 |
| supply member: 50 | penetration opening: 51 |
| sealing member: 52 | rotation body: 60, 70 |
| side supply member: 80 | |

What is claimed is:

1. A fuel cell stack comprising:
at least one membrane electrolyte assembly comprising an electrolyte membrane, an anode on a first surface of the electrolyte membrane, and a cathode on a second surface opposite to the first surface of the electrolyte membrane;
at least one supply member coupled to the electrolyte membrane and configured to supply a conductive material to the electrolyte membrane; and
a rotation body that penetrates the at least one supply member and is rotatable with respect to the electrolyte membrane such that the conductive material can be supplied to the electrolyte membrane by a centrifugal force, wherein the rotation body has a protruding portion that is configured to receive a torque at one side thereof and has a spiral protrusion on an external circumferential surface.

2. The fuel cell stack of claim 1, wherein the supply member comprises:
a first supply member that contacts the first surface of the electrolyte membrane; and
a second supply member that contacts the second surface of the electrolyte membrane.

3. The fuel cell stack of claim 2, wherein the first supply member and the second supply member each have a penetration opening and wherein the penetration opening of the first supply member is in communication with penetration opening of the second supply member.

4. The fuel cell stack of claim 3, wherein the first supply member and the second supply member are connected to each other to by a connection passage within the fuel cell stack.

5. The fuel cell stack of claim 4, wherein the conductive material is phosphoric acid and wherein the connection passage is configured to accommodate the conductive material.

6. The fuel cell stack of claim 1, wherein the supply member has a penetration opening and comprises at least one sealing member on a periphery of the penetration opening.

7. The fuel cell stack of claim 1, wherein the rotation body has a protruding portion that is configured to receive a torque at one side thereof and comprises at least one protrusion that is located at a side generally opposite to the protruding portion.

8. The fuel cell stack of claim 1, wherein the supply member is coupled to an outer circumferential surface of the membrane electrode assembly.

9. The fuel cell stack of claim 8, wherein the supply member has at least one coupling groove that comprises a hollow portion and that is coupled to the electrolyte membrane.

10. The fuel cell stack of claim 9, wherein the conductive material is phosphoric acid.

* * * * *